UNITED STATES PATENT OFFICE.

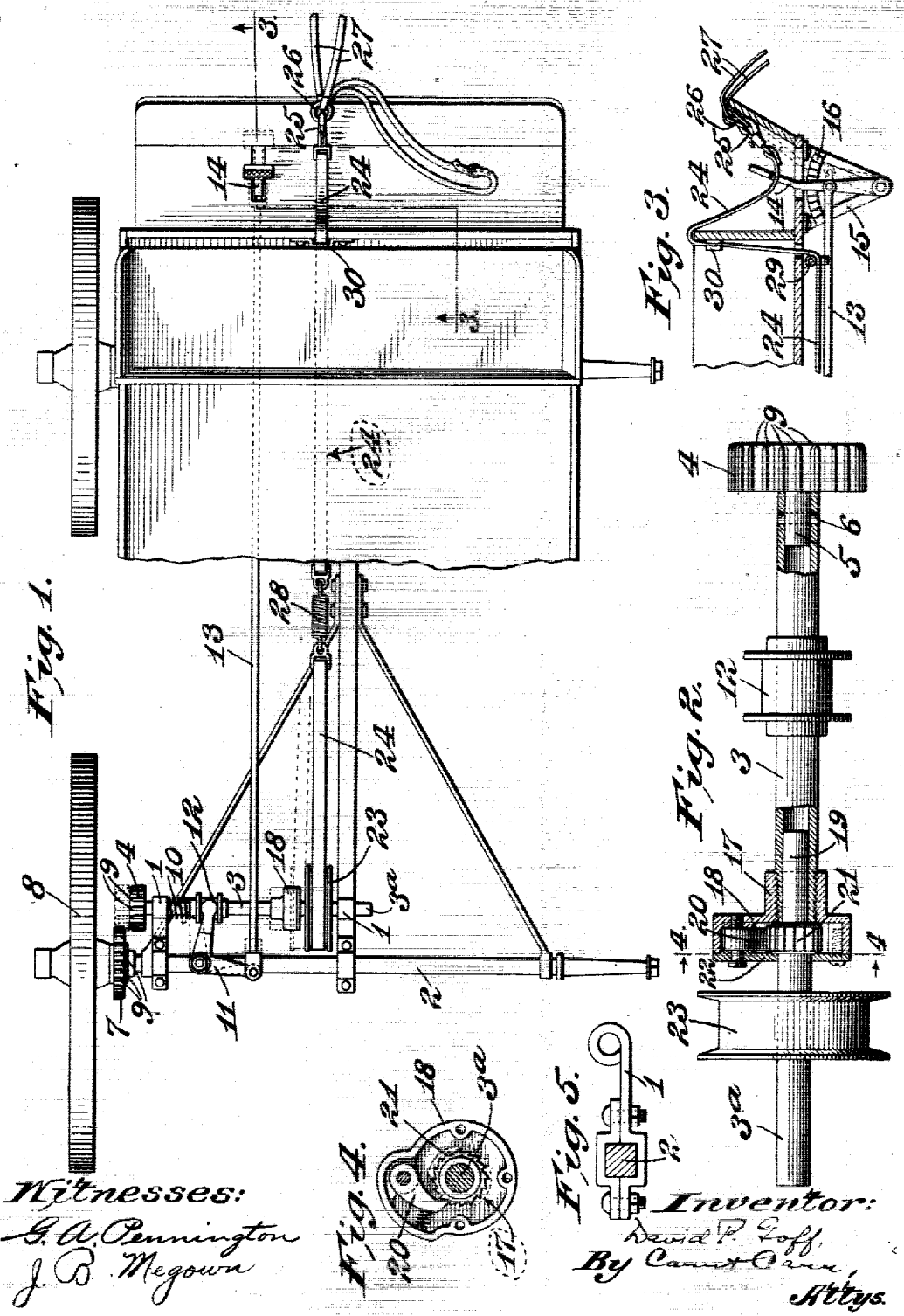

DAVID P. GOFF, OF DE SOTO, MISSOURI.

HITCHING DEVICE.

No. 853,631.        Specification of Letters Patent.        Patented May 14, 1907.

Application filed May 21, 1906. Serial No. 318,097.

*To all whom it may concern:*

Be it known that I, DAVID P. GOFF, a citizen of the United States, and a resident of De Soto, county of Jefferson, and State of Missouri, have invented a new and useful Improvement in Hitching Devices, of which the following is a specification.

My invention relates to hitching devices, and has for its principal objects to produce a simple and effective mechanism embodying a minimum number of parts, which can be cheaply manufactured and readily applied to vehicles to prevent the animals drawing the same from running away; and to attain certain other advantages hereinafter more fully appearing.

The invention consists in the parts and in the arrangements and combinations of parts hereinafter described and claimed.

In the accompanying drawings which form part of this specification, and wherein like symbols refer to like parts wherever they occur, Figure 1 is a plan view of a vehicle with the wheels removed from one side and a portion of the bed broken away to more clearly show the manner of applying my improved hitching device; Fig. 2 is an enlarged detail view of the operating shaft and the parts carried thereby, portions being shown in section; Fig. 3 is a section on line 3—3 of Fig. 1; Fig. 4 is a detail view of the ratchet-clutch, on the line 4—4 of Fig. 2; and, Fig. 5 is a detail view of a bracket-bearing.

The device is intended for attachment to vehicles of any character, preferably to the rear or fixed axle thereof. Bracket-bearings 1 are adjustably secured upon the rear axle 2. In these bearings is slidingly mounted a sectional operating shaft comprising a tubular section 3 and a solid section 3ª. The tubular section carries a pinion 4 at one end. The pinion is formed with a stud or shank portion 5 which is forced into the bore of the tubular shaft section and secured by a pin 6. In certain positions of the shaft, this pinion 4 will mesh with a gear wheel 7 secured to the hub of one of the rear wheels 8. The end portions of the teeth at the adjacent faces of the pinion 4 and gear wheel 7 are beveled or sharpened as at 9 to facilitate the intermeshing of the pinion and gear wheel.

The operating shaft is yieldingly held in normal position longitudinally in its bearings by a spring 10 and is adapted to be moved longitudinally by means of a bell crank lever 11 mounted on the axle 2. One end of this bell crank lever engages a grooved collar 12 fixedly mounted on the shaft section 3. The other end of the bell crank lever is pivotally secured to a rod 13 connecting with a lever 14 mounted upon a bracket 15 beneath the bed of the vehicle. The lever 14 is similar to an ordinary brake lever and, preferably, is of the foot-operated type, as shown. A toothed sector 16 is adapted to be engaged by the lever 14 and hold it in its operative positions.

The end portion of the tubular section of the shaft 3 opposite to the pinion 4 is secured in the threaded hub 17 of a casing 18, and also receives the reduced end portion 19 of the section 3ª and forms a bearing therefor. In the casing 18 is mounted a spring-pressed pawl 20 which is adapted to engage a ratchet wheel 21 fixedly mounted on the shaft section 3ª. The casing 18 is provided with a cover plate 22 and thus the ratchet wheel 21 is completely incased; hence, both shaft sections 3 and 3ª will participate in the longitudinal movement imparted by the bell crank lever 10. The pawl and ratchet connection, however, permits each section to be independently rotated in one direction.

Upon the shaft section 3ª is a drum 23 provided with peripheral flanges. A strap 24 is secured at one end to said drum 23, and at its other end is provided with a snap-hook 25 adapted to engage rings 26 or other securing devices on the lines 27. Preferably, the strap 24 is divided at a suitable point in its length, and its sections are connected by an interposed spring 28.

The free end of the strap 24 may be made to terminate at any convenient point within reach of the driver. It is preferable, however, to carry the strap under an anti-friction roller 29, thence upward through an opening in the bottom of the bed and through a retaining yoke 30 on the inside of the front end of the bed, and thence over and beyond said front end as shown in the drawings.

In operation, when it is desired to hitch the horse, the pinion 4 is moved into mesh with the gear wheel 7. This is accomplished by sliding the operating shaft by means of the lever 14 and intermediate connections. The snap-hook 25 is then fastened in the rings 26 on the lines 27. Should the horse start forward after the lines have been connected to the snap-hook, the forward movement of the vehicle will impart a rotary movement to the shaft section 3 through the intermeshing gear wheel 7 and pinion 4. Shaft section 3 transmits its movement to section 3ª by means of the pawl and ratchet. The strap 24 is thus wound upon the drum 23 and thereby draws the lines 27 tight. If, however, the horse should back, the drum will not be rotated, as the pawl 20 will simply slip over the teeth on the ratchet wheel 21. The spring 28 is used to lessen the shock upon the horse's mouth, if he should lunge forward.

Obviously, my device is capable of considerable modification within the scope of my invention, and therefore I do not wish to be limited to the specific construction shown and described.

What I claim as my invention, and desire to secure by Letters Patent is:

1. In a hitching device, a rotatable and longitudinally movable sectional shaft comprising a tubular main section and a secondary section having a bearing in one end of said tubular section, a pawl and ratchet connection between said main and secondary shaft sections, whereby said sections are caused to move longitudinally and to rotate in one direction simultaneously, and whereby one of said sections is free to rotate independently in the other direction, a drum on said secondary shaft section, a hitching strap secured to said drum and adapted to be wound thereon, said strap being divided and joined by a spring, and having a connecting device at its free end, a pinion on said main shaft section adapted to engage a gear wheel on a vehicle wheel, and means for moving said pinion into mesh with said gear wheel.

2. In a hitching device, a rotatable and longitudinally movable sectional shaft comprising a tubular main section and an independently rotatable auxiliary section having a bearing in one end of said main section, a pawl and ratchet connection between said sections comprising a ratchet wheel secured on said auxiliary section, and a casing secured on said main section inclosing said ratchet wheel and having a pawl mounted therein and adapted to engage said ratchet wheel, a drum on said auxiliary section, a hitching strap secured to said drum and adapted to be wound thereon, a pinion on said main section, a gear wheel mounted on a vehicle wheel in coöperative relation to said pinion, and means for moving said shaft longitudinally to move the pinion into mesh with said gear wheel.

3. A hitching device comprising a gear wheel mounted on a vehicle wheel, a rotatable and longitudinally movable shaft mounted in bearings on a fixed portion of said vehicle, said shaft comprising a tubular main section and an independently rotatable auxiliary section having a bearing in one end of said main section, a pawl and ratchet connection between said sections comprising a ratchet wheel on said auxiliary section and a casing on said main section inclosing said ratchet wheel and having a pawl mounted therein in engagement with said ratchet wheel, a drum on said auxiliary section, a hitching strap secured to said drum and adapted to be wound thereon, a pinion on said main section in coöperative relation to said gear wheel, means for yieldingly holding said shaft in normal longitudinal position, means for moving said shaft longitudinally to move said pinion and gear wheel into mesh, and means for holding said moving means in its operative position.

In testimony whereof I have signed my name to this specification in the presence of two subscribing witnesses this 15th day of May, 1906, at St. Louis, Missouri.

DAVID P. GOFF.

Witnesses:
J. B. MEGOWN,
G. A. PENNINGTON.